Patented July 25, 1933

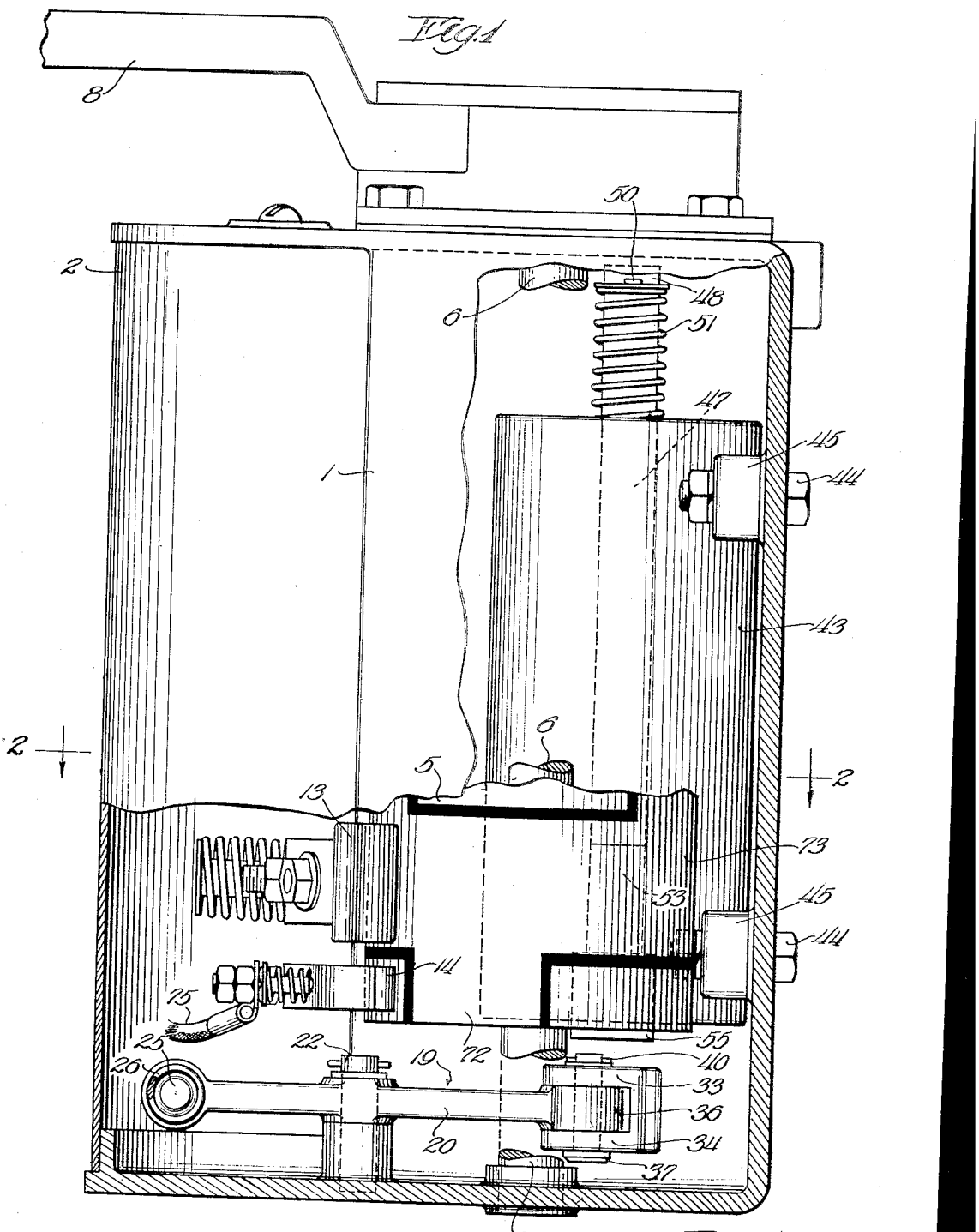

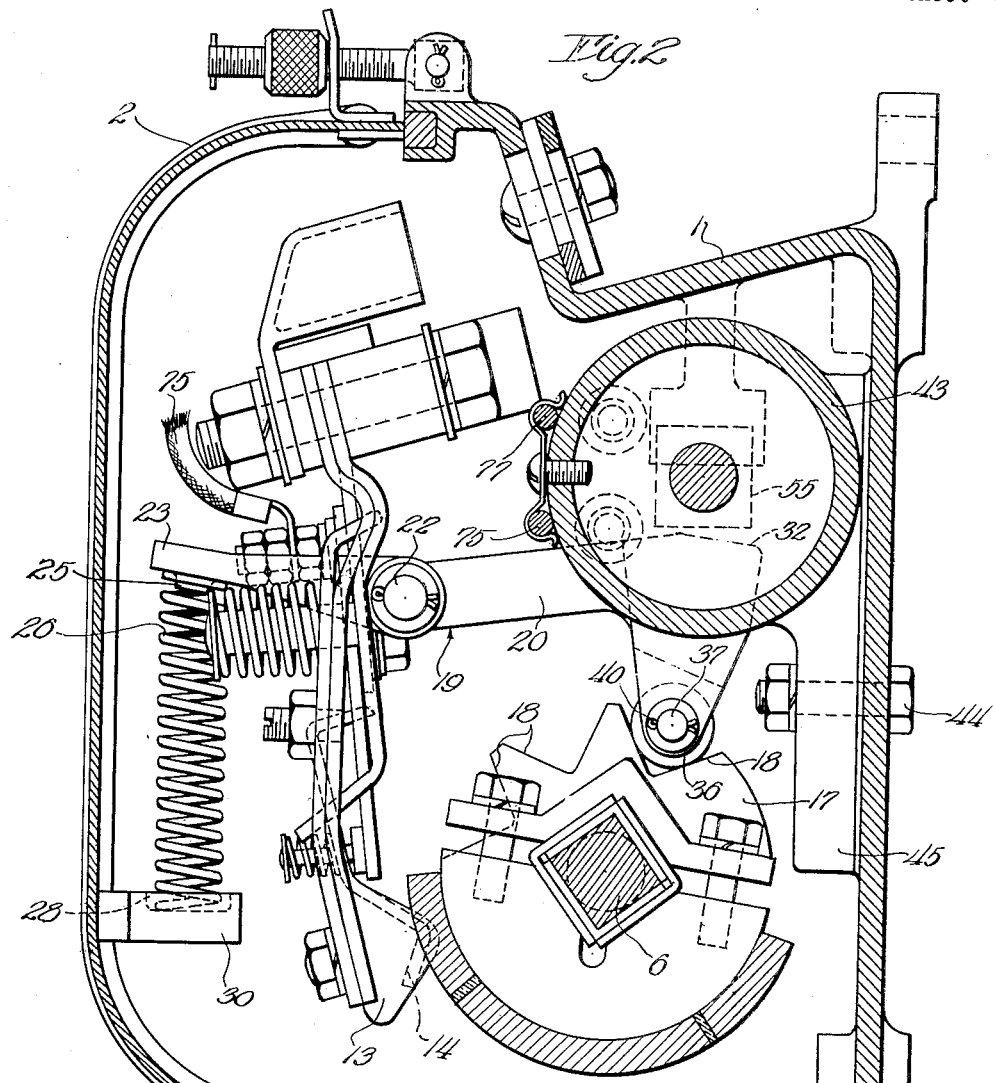

1,919,913

UNITED STATES PATENT OFFICE

LEIGH J. STEPHENSON, OF CHICAGO, ILLINOIS, ASSIGNOR TO WALKER VEHICLE COMPANY, OF CHICAGO, ILLINOIS, A CORPORATION OF ILLINOIS

INTERLOCKING SWITCH

Application filed February 18, 1931. Serial No. 516,537.

The present invention relates generally to control means for electrical devices and has special reference to an interlocking arrangement in such control means which is so constructed and arranged that the power may be cut off or interrupted through more than one instrumentality but the power may not be turned on again unless said instrumentalities are actuated in a certain and predetermined manner.

The present invention has been illustrated in connection with the main controller and the reversing switch of an electrically propelled vehicle and, in that connection, has for its principal object the provision of an electrically operated mechanical interlock construction wherein either the main controller or the reverser is operable to cut off power to the motor of the vehicle, but the power may not be turned on except by the main controller.

While I have chosen to illustrate the present invention in connection with an electric vehicle it is to be understood that the principles of my invention may be applied to other constructions. In connection with electrical vehicles, however, and particularly in connection with industrial trucks of the electrically driven type, my invention is especially advantageous. In such trucks it is common to provide a reversing switch and a main controller for controlling the application of current to the motor of the vehicle. In normal operation the reversing switch is turned either to a forward position or to a reverse position in accordance with the direction in which it is desired that the vehicle shall move, and then the main controller is turned from its off position to its on position thereby controlling circuits and gradually stepping the amount of current going to the motor in order to properly accelerate the vehicle without throwing a sudden load on the motor. The position of the main controller governs the running speed of the vehicle and when it is desired to stop normally the main controller is turned to its off position.

It is well recognized that the reversing switch should not be moved to any closed circuit position while the main controller is on, otherwise there is considerable danger of damaging the contacts or burning out the windings due to the sudden application of a heavy current. Various interlocks have been developed for preventing just this condition, and usually they include some form of means for preventing the movement of either the reverser or the main controller unless the other is in its proper position. In other words, when the main controller is on the reverser may not be turned and, conversely, when the reverser is off the main controller may not be turned on. It sometimes may occur, however, that when the vehicle is in operation with the reverser in proper position and the main controller turned on the latter becomes jammed or otherwise disabled in such a way that it cannot be turned off. With the prior art construction when the controller is on the reverser is prevented from being turned to its off position and hence, in the situation just indicated, there may be danger of an accident due to the fact that these two controls are not available to cut off the power.

It is, therefore, the principal object of the present invention to provide a construction avoiding the defects just pointed out by arranging the interlock construction in such a manner that the reverser itself may be used as an emergency cut-off switch and is operable to disconnect the power while still operating in the usual manner to prevent the reverser from being turned on while the main or power controller is turned on.

Another object of my invention is to provide the type of interlocking described when the controller is a manually or mechanically operated device, and the reverser is a separate piece of apparatus located away from the controller. Well known devices are available for providing interlocking between a separately mounted reverser and a controller, but these, being strictly electrical interlocks, are limited in their application to controllers employing magnetically or electro-pneumatically operated switches or their equivalent.

Other objects and advantages of the present invention will be apparent to those skilled in the art after a consideration of the following detailed description of one structural embodiment thereof, taken in conjunction with the accompanying drawings, in which:

Figure 1 is a side elevation of a reversing switch construction for an electric vehicle, certain parts being broken away to better show the construction of the interlocking mechanism for the reverser;

Figure 2 is a cross section taken substantially along the line 2—2 of Figure 1; and Figure 3 is a diagrammatic sketch illustrating the electric connections.

Referring now more particularly to Figures 1 and 2, the reference numeral 1 indicates in its entirety the casing or housing for the control mechanism, the casing 1 having a removable closure 2 at one side to allow access to the operating mechanism. The main controller is of conventional design and of itself forms no part of the present invention and has, therefore, not been illustrated in the drawings except that the reference numeral 4 in Figure 3 indicates the power switch which is closed when the main controller is turned from its off position to a running position.

Supported within the casing or housing 1 is the reverser drum 5 fixedly mounted on an operating shaft 6 carried in bearing bosses formed in the casing 1. An operating handle 8 is connected with one end of the shaft 6, one end of which extends outside the housing 1 for this purpose. The reversing drum 5 is of conventional form as regards the reversing connections and no novelty is claimed in them per se. For this reason the reverser drum 5 has been shown as broken away in Figure 1 in order to more clearly show the electromagnetic means for controlling the interlocking mechanism to be described in detail hereinafter. The electrical contact means provided by the reverser drum is, however, indicated in the sketch shown in Figure 3, and from this figure it will be seen that a plurality of contacts 10 to 14 are provided. These contacts are arranged in operative association with contact blocks or plates which will be described hereinafter in greater detail.

A star wheel 17 is secured to the lower end of the reverser shaft 6 and is fixed thereto in any desired manner. The star wheel 17 is best shown in Figures 2 and 3 but it has been omitted in Figure 1 for the sake of clarity. The star wheel 17 is provided near one side with three notches 18 for the purpose of receiving a click pawl structure indicated in its entirety by the reference numeral 19. The click pawl 19 includes a pivoted arm 20 supported for movement about a pivot stud 22 carried by the housing 1. One end 23 of the pawl arm 20 is extended beyond the pivot 22 and is provided with a lug or projection 25 engaged within one end of a coil spring 26, best shown in Figure 2. The other end of the spring 26 is carried within a shallow recess 28 formed in one side of an abutment 30 also carried by the housing 1.

The opposite end of the pawl arm 20 is extended laterally to provide a widened abutment face 32 and this end of the pawl arm 20 is also formed with a pair of apertured ears 33 and 34. Between the ears or lugs 33 and 34 there is a roller 36 journaled on a pivot pin 37 held within the apertured ears 33 and 34 by means such as a cotter key 40. The spring 26, tensioned between the abutment 30 and the end 23 of the pawl arm 20, biases the pawl arm to a position where the roller 36 engages within one of the notches 18 formed in the star wheel 17. The pawl arm structure just described is operative to yieldingly retain the reverser drum in any one of its three positions, these positions being indicated in Figure 3 as "Off", "Forward" and "Reverse".

An iron clad solenoid 43 is provided within the casing 1 and secured therein by bolts 44 passing through the casing 1 and through brackets 45 formed on the iron clad solenoid 43. A plunger 47 operates within the solenoid 43, the plunger 47 being provided with a stem 48 extending without the cast iron cylinder of the solenoid 43. An abutment in the form of a pin or cotter key 50 is carried at the outer end of the stem 48, and a spring 51 is tensioned between the abutment 50 and the adjacent end of the solenoid cylinder. The spring 51 is therefore arranged to bias the plunger 47 toward an upper position as viewed in Figure 1.

The plunger 47 is constructed partly of steel or other magnetic material and partly of brass, the brass portion being indicated by the reference numeral 53. As viewed in Figure 1, the lower end of the brass portion 53 carries an approximately square head 55 thereon, which is also preferably formed of brass or other non-magnetic material.

The brass portion 53 is so dimensioned that when the plunger 47 is in its upper position the head 55 lies in a plane above the pawl arm 20, as will be understood by referring to Figure 1. When the solenoid 43 is energized the plunger 47 is drawn within the solenoid 43, whereupon the head 55 is pushed behind the abutment face 32 of the pawl arm 20. In this position, therefore, the pawl arm 20 is prevented from moving out of the notch on the star wheel 17 and it is therefore impossible to turn the reverser drum from one notch to another as long as the solenoid 43 is energized.

As has been indicated above, it is desired to so arrange the solenoid and the interlock mechanism that the reverser switch will be prevented from moving out of its off position only so long as the power is turned on at the main controller. This result is secured in a manner which will be understood by referring to the schematic diagram shown in Figure 3. In this figure the position of the solenoid 43 has been changed in order to more clearly illustrate its operation. In Figure 3 the source of current for the vehicle is indicated by the reference numeral 60 and comprises a battery the leads from which extend to the main controller switches or contacts and to the reverser drum. The switches or contacts included in the main controller are indicated by the reference numerals 61 to 64 and the main controller also includes what I term the power switch 4. The particular arrangement of the main controller including these switches or contacts does not of itself form any part of the present invention and the structure of the main controller is not shown except that the contacts or switches in Figure 3 are indicative of such main controller structure. The lead or conductor 66 connects the source of current to the power switch 4 and the lead or conductor 67 connects the source of current to contact 13 of the reverser switch. The main controller, including the switches 4, 61, 62, 63, and 64 may be referred to as a speed controlling switch in that it controls the speed of the motor 70 by progressively reducing the resistance in series with the motor. In the " off " position of the speed controlling switch, the switch 4 and the switches 61 through 64 are open. In the " on " or operative position of the speed controlling switch the switch 4 is closed and one or more of the switches 61 through 64 are closed as the speed controlling switch is further actuated to increase the motor speed.

The reverser drum is of usual construction and includes a number of contact plates or discs and are so arranged in the usual manner to cooperate with the contacts 10 to 13 to send current through the armature 70 of the vehicle motor either in one direction or the other according to the position of the reverser drum in order to drive the vehicle in a forward or reverse direction under the control of the operator. In Figure 3 the positions of the various contacts relative to the drum are indicated in dotted lines for the forward or reverse positions and in full lines for the off position.

The present invention contemplates associating with the usual reverser drum structure a contact plate 72 which is electrically associated with the contact plate 73 of the reverser drum proper. The contact plate 72 is so dimensioned and arranged that when the reverser drum is turned to its off position the contact 14 rides onto the plate 72 and completes an electrical circuit as far as these two contacts are concerned.

A lead 75 extends from the contact 14 and connects with the electromagnetic coil of the solenoid 43. The other end of the coil is connected through conductor 77 to the power switch 4 at a point opposite the lead or conductor 66.

The operation of the interlocking reverser of the present invention is substantially as follows: When the reverser drum is turned to its off position the contacts are arranged as indicated in Figure 3, that is, contacts 10, 11 and 12 are out of contact with any of the conductor plates or discs of the reserver drum and hence the motor 70 receives no current. Contact 13 is, however, riding on the contact plate 73 and contact 14, which is connected with one end of the solenoid 43, is in contact with the plate 73. Solenoid 43 is therefore connected at one end to the source of current 60. The other end of the solenoid coil is connected to the power switch 4 beyond the lead 66, and hence if the power switch 4 is not closed the solenoid is not energized. If, however, the main controller is operated the first switch closed is the power switch 4. If when the main controller is turned the reverser drum is in its off position, where contacts 13 and 14 are connected, the circuit is closed through the solenoid and the source of current 60 and the plunger 47 is drawn within the coil and the head 55 is positioned behind the pawl arm 20 so that now the reverser drum is locked and cannot be turned. It is therefore impossible for the reverser to be moved from its off position in either direction as long as the controller is on a running position.

When the power switch 4 is opened the coil 43 is deenergized because the solenoid circuit is broken at 4 and the spring 51 withdraws the plunger 47 from within the solenoid coil and moves the abutment head 55 free of the pawl arm 20. When this occurs the reverser drum may be turned by moving the handle 8 and may be positioned either in a forward or a reverse position. When the reverser drum is so turned the contact plate 72 moves from under the contact 14 and hence the circuit through the solenoid coil 43 cannot be completed by any subsequent closing of the power switch 4 because the solenoid circuit is now open at 14—72. This is the normal position of the reverser and main controller; that is, first the operator positions the reverser in accordance with the direction the vehicle is to be moved, then the main controller is turned from its off position, first closing the power switch 4 and then operating the other switches 61 to 64 to cut out resistances in order to gradually supply the current to the motor.

Since contact 14 is spaced from the contact plate 72 when the reverser is in its forward or reverse position the solenoid 43 is not energized and hence the reverser drum may be turned from either of its operating positions to its off position even when the switch 4 is closed. Thus the reverser may be operated to cut off power from the motor at any time, regardless of the position of the main controller which, as has been pointed out above, may under certain conditions be jammed or otherwise out of order so that it could not be turned off. As soon, however, as the reverser is moved either from its forward or its reverse position to off position when the main controller is on, the circuit from the source of current 60 is completed through the closed power switch 4 and through the contact 14 and the contact plate 72 so that the plunger 47 is immediately thrown within the solenoid and the head 55 locks the pawl lever 20 in the notch 18 corresponding to the off position of the reverser and thereby effectively prevents the reverser from being subsequently moved out of its off position until the main controller is brought again to an open circuit position. In this way the reverser is operable as an emergency cut-off to interrupt the circuit to the driving motor or motors of the vehicle should the main controller be jammed or otherwise disabled.

While I have shown and described my invention in connection with the reversing and the main controller switches for an electric vehicle, it will be obvious to those skilled in the art that the principles of the present invention may be embodied in various other and widely different constructions and uses. It is to be understood, therefore, that the present invention is not to be limited to the specific structure and use shown and described. In fact, the present invention is applicable to any installation wherein current is to be supplied to some form of electrical power translating device which is operable in different directions and also to any installation wherein two devices are to be interlocked to prevent a particular movement under specified conditions.

What I claim and desire to secure by Letters Patent is:

1. The combination with a power translating device and a power switch and a second switch therefor, of means for preventing said second switch from being moved from a normal open circuit position while the power switch is closed but allowing said second switch to be moved to a normal open circuit position while the power switch is closed.

2. A controller comprising, in combination, a power switch, a second switch having an off position and at all times free for movement to the off position, an interlock for said second switch adapted to lock the second switch in the off position, and operative connections for said interlock including contacts and connections adapted to close an interlock circuit when the second switch is in the off position and the power switch is in a predetermined position.

3. An electric control mechanism for an electric switch comprising a movable switch element having an off position and at all times free for movement to the off position, said control mechanism comprising a member movable with said switch element, a fixed abutment, an electrically operated interlock mechanism cooperating with said abutment and said movable member and adapted when energized to lock said switch, and means to control the energization of said mechanism and including a source of current and contact movable with said switch adapted to energize the interlock when the switch is turned to its off position and thereby complete a circuit through said source of current.

4. A controller comprising, in combination, a power switch, a second switch, an interlock for said second switch adapted to lock the second switch in one position, said interlock comprising mechanism operable in one position to prevent the movement of said second switch, electromagnetic means for controlling the movement of said mechanism toward said position and means biasing said mechanism for movement toward an opposite position, and operative connections for said interlock including contacts and connections adapted to close a circuit through said electromagnetic means when the second switch is opened and the power switch is closed and to open said circuit when the second switch is closed or the power switch is opened.

5. A control mechanism for a pair of switches in series, comprising a mechanical lock for one switch movable to and from switch locking position, magnetic means controlling the movement of said mechanical lock, and operative connections for said magnetic means including contacts adapted to be closed only when one switch is in open circuit position and the other switch is in closed circuit position whereby when both of said switches are closed the magnetic lock is in inoperative position and either switch may be employed to open the circuit therethrough.

6. A control mechanism for a pair of switches in series, comprising a mechanical lock for one switch movable to and from switch locking position for holding said one switch in open circuit position, magnetic means controlling the movement of said mechanical lock, an operative connections for said magnetic means including contacts adapted to be closed only when said one switch is in open circuit position and the other switch is in closed circuit position whereby said one switch is prevented from being moved to a closed circuit position while the other switch is closed.

7. In an electric vehicle, a motor, a source of current, switch means controlling the application of current to the motor, a reversing switch movable to and from an off position, an interlock for said reversing switch comprising a star wheel movable therewith, a spring pressed pawl in operative association with the notches of said star wheel, a movable member operative to fix the pawl and prevent movement of the star wheel and reversing switch, and electromagnetic means controlling the operation of said movable member and actuated only when the reversing switch is in its off position and the controlling switch means is in closed position, whereby while the reversing switch is in off position and a circuit is closed through said motor and source of current movement of said reversing switch is prevented.

8. In a motor control system, the combination of a direction switch having an " off " position, a speed control switch, said direction switch being movable to the off position independently of the position of the speed control switch, and means for preventing the establishment of a motor circuit by the direction switch when the speed control switch is in certain predetermined operative speed controlling positions.

9. A motor vehicle including an electric vehicle-propelling motor, circuit connections therefor including reversing switching means and speed control switching means, said two sets of switching means being separately actuated and each operable independently of the other to disable the motor circuit, and means rendered effective when one of the switching means is in its motor-disabling position for disabling said one switching means until the other switching means has been moved to a predetermined position.

10. A motor vehicle including an electric vehicle-propelling motor, a direction switch for the motor, said direction switch having an " off " position for disabling the motor circuit, a speed control switch for the motor, said direction switch being at all times operable to its "off" position independently of the position of the other switch, and means for rendering the direction switch ineffective to reestablish operating conditions of the motor when the speed control switch is in certain of its operative speed controlling positions.

11. A motor vehicle including a primary source of power comprising a storage battery, an electric vehicle-propelling motor, a direction switch for the motor, said direction switch having an "off" position for disabling the motor circuit, a speed control switch for the motor including means for disabling the motor circuit and resistance means in the motor circuit when the motor is started and progressively decreased in value as the speed control switch is actuated, said direction switch being at all times operable to its " off " position independently of the position of the other switch, said other switch bein operable independently of the position of the direction switch, and means for rendering the direction switch ineffective to reestablish operating conditions of the motor when the speed control switch is in certain of its operative speed controlling positions.

LEIGH J. STEPHENSON.